(12) United States Patent
Levi et al.

(10) Patent No.: US 11,277,455 B2
(45) Date of Patent: Mar. 15, 2022

(54) STREAMING SYSTEM

(71) Applicant: MELLANOX TECHNOLOGIES, LTD., Yokneam (IL)

(72) Inventors: Dotan David Levi, Kiryat Motzkin (IL); Alex Vainman, Modiin (IL); Natan Manevich, Ramat Hasharon (IL); Nir Nitzani, Tel Aviv (IL); Ilan Smith, Kfar Ben Nun (IL); Richard Hastie, Nantwich (GB); Noam Bloch, Bat Shlomo (IL); Lior Narkis, Petah-Tikva (IL); Rafi Weiner, Kiryat Netafim (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 112 days.

(21) Appl. No.: 16/430,457

(22) Filed: Jun. 4, 2019

(65) Prior Publication Data

US 2019/0379714 A1 Dec. 12, 2019

Related U.S. Application Data

(60) Provisional application No. 62/793,401, filed on Jan. 17, 2019, provisional application No. 62/681,708, filed on Jun. 7, 2018.

(51) Int. Cl.
*H04L 29/06* (2006.01)
*H04L 12/861* (2013.01)
(Continued)

(52) U.S. Cl.
CPC ...... *H04L 65/4092* (2013.01); *H04L 47/2441* (2013.01); *H04L 47/28* (2013.01);
(Continued)

(58) Field of Classification Search
CPC ..... H04L 65/4092; H04L 65/80; H04L 67/42; H04L 49/90; H04L 47/2441; H04L 47/28;
(Continued)

(56) References Cited

U.S. PATENT DOCUMENTS 4,933,969 A 6/1990 Marshall et al.
5,068,877 A 11/1991 Near et al.
(Continued)

OTHER PUBLICATIONS

Danalis et al., "PTG: an abstraction for unhindered parallelism", 2014 Fourth International Workshop on Domai—Specific Languages and High-Level Frameworks for High Performance Computing, pp. 1-10, Nov. 17, 2014.
(Continued)

*Primary Examiner* — Austin J Moreau
(74) *Attorney, Agent, or Firm* — Kligler & Associates Patent Attorneys Ltd

(57) ABSTRACT

A method including configuring a transmit process to store information including a queue of packets to be transmitted, the queue defining transmit process packets to be transmitted, each packet associated with a transmission time, and configuring a synchronization process to receive from the transmit process at least some of the information. The synchronization process performs one of: A) accessing a dummy send queue and a completion queue, and transmitting one or more of the transmit process packets in accordance with a completion queue entry in the completion queue, and B) sends a doorbell to transmission hardware at a time when at least one of the transmit process packets is to be transmitted, the synchronization process including a master queue configured to store transmission entries, each transmission entry including a transmit process indicator and an indication of transmit process packets to be transmitted. Related apparatus and methods are also described.

18 Claims, 3 Drawing Sheets

(51) Int. Cl.
*H04L 12/851* (2013.01)
*H04L 12/841* (2013.01)
*H04L 12/801* (2013.01)
*H04L 12/823* (2013.01)
*H04L 65/613* (2022.01)
*H04L 65/80* (2022.01)
*H04L 67/01* (2022.01)
*H04L 49/90* (2022.01)
*H04L 47/2441* (2022.01)
*H04L 47/28* (2022.01)
*H04L 47/34* (2022.01)
*H04L 47/32* (2022.01)
H04L 29/08 (2006.01)
H04L 67/06 (2022.01)

(52) U.S. Cl.
CPC .............. *H04L 47/32* (2013.01); *H04L 47/34* (2013.01); *H04L 49/90* (2013.01); *H04L 65/80* (2013.01); *H04L 67/42* (2013.01); *H04L 67/06* (2013.01)

(58) Field of Classification Search
CPC ......... H04L 47/34; H04L 47/32; H04L 67/06; H04L 65/4084; H04L 65/602; H04L 65/607; H04J 3/0697
See application file for complete search history.

(56) References Cited

U.S. PATENT DOCUMENTS

| | | |
|---|---|---|
| 5,325,500 A | 6/1994 | Bell et al. |
| 5,353,412 A | 10/1994 | Douglas et al. |
| 5,404,565 A | 4/1995 | Gould et al. |
| 5,606,703 A | 2/1997 | Brady et al. |
| 5,944,779 A | 8/1999 | Blum |
| 6,041,049 A | 3/2000 | Brady |
| 6,370,502 B1 | 4/2002 | Wu et al. |
| 6,483,804 B1 | 11/2002 | Muller et al. |
| 6,507,562 B1 | 1/2003 | Kadansky et al. |
| 6,728,862 B1 | 4/2004 | Wilson |
| 6,775,698 B1 | 8/2004 | Simone et al. |
| 6,857,004 B1 | 2/2005 | Howard et al. |
| 6,937,576 B1 | 8/2005 | Di Benedetto et al. |
| 7,102,998 B1 | 9/2006 | Golestani |
| 7,124,180 B1 | 10/2006 | Ranous |
| 7,164,422 B1 | 1/2007 | Wholey, III et al. |
| 7,171,484 B1 | 1/2007 | Krause et al. |
| 7,313,582 B2 | 12/2007 | Bhanot et al. |
| 7,327,693 B1 | 2/2008 | Rivers et al. |
| 7,336,646 B2 | 2/2008 | Muller |
| 7,346,698 B2 | 3/2008 | Hannaway |
| 7,555,549 B1 | 6/2009 | Campbell et al. |
| 7,613,774 B1 | 11/2009 | Caronni et al. |
| 7,636,424 B1 | 12/2009 | Halikhedkar et al. |
| 7,636,699 B2 | 12/2009 | Stanfill |
| 7,738,443 B2 | 6/2010 | Kumar |
| 8,213,315 B2 | 7/2012 | Crupnicoff et al. |
| 8,380,880 B2 | 2/2013 | Gulley et al. |
| 8,510,366 B1 | 8/2013 | Anderson et al. |
| 8,738,891 B1 | 5/2014 | Karandikar et al. |
| 8,761,189 B2 | 6/2014 | Shachar et al. |
| 8,768,898 B1 | 7/2014 | Trimmer et al. |
| 8,811,417 B2 | 8/2014 | Bloch et al. |
| 9,110,860 B2 | 8/2015 | Shahar |
| 9,189,447 B2 | 11/2015 | Faraj |
| 9,294,551 B1 | 3/2016 | Froese et al. |
| 9,344,490 B2 | 5/2016 | Bloch et al. |
| 9,563,426 B1 | 2/2017 | Bent et al. |
| 9,626,329 B2 | 4/2017 | Howard |
| 9,756,154 B1 | 9/2017 | Jiang |
| 10,015,106 B1 | 7/2018 | Florissi et al. |
| 10,158,702 B2 | 12/2018 | Bloch et al. |
| 10,296,351 B1 | 5/2019 | Kohn et al. |
| 10,305,980 B1 | 5/2019 | Gonzalez et al. |
| 10,318,306 B1 | 6/2019 | Kohn et al. |
| 10,425,350 B1 | 9/2019 | Florissi |
| 10,541,938 B1 | 1/2020 | Timmerman et al. |
| 10,621,489 B2 | 4/2020 | Appuswamy et al. |
| 2002/0010844 A1 | 1/2002 | Noel et al. |
| 2002/0035625 A1 | 3/2002 | Tanaka |
| 2002/0150094 A1 | 10/2002 | Cheng et al. |
| 2002/0150106 A1 | 10/2002 | Kagan et al. |
| 2002/0152315 A1 | 10/2002 | Kagan et al. |
| 2002/0152327 A1 | 10/2002 | Kagan et al. |
| 2002/0152328 A1 | 10/2002 | Kagan et al. |
| 2003/0018828 A1 | 1/2003 | Craddock et al. |
| 2003/0061417 A1 | 3/2003 | Craddock et al. |
| 2003/0065856 A1 | 4/2003 | Kagan et al. |
| 2004/0062258 A1 | 4/2004 | Grow et al. |
| 2004/0078493 A1 | 4/2004 | Blumrich et al. |
| 2004/0120331 A1 | 6/2004 | Rhine et al. |
| 2004/0123071 A1 | 6/2004 | Stefan et al. |
| 2004/0252685 A1 | 12/2004 | Kagan et al. |
| 2004/0260683 A1 | 12/2004 | Chan et al. |
| 2005/0097300 A1 | 5/2005 | Gildea et al. |
| 2005/0122329 A1 | 6/2005 | Janus |
| 2005/0129039 A1 | 6/2005 | Biran et al. |
| 2005/0131865 A1 | 6/2005 | Jones et al. |
| 2005/0281287 A1 | 12/2005 | Ninomi et al. |
| 2006/0282838 A1 | 12/2006 | Gupta et al. |
| 2007/0127396 A1 | 6/2007 | Jain et al. |
| 2007/0162236 A1 | 7/2007 | Lamblin et al. |
| 2008/0104218 A1 | 5/2008 | Liang et al. |
| 2008/0126564 A1 | 5/2008 | Wilkinson |
| 2008/0168471 A1 | 7/2008 | Benner et al. |
| 2008/0181260 A1 | 7/2008 | Vonog et al. |
| 2008/0192750 A1 | 8/2008 | Ko et al. |
| 2008/0244220 A1 | 10/2008 | Lin et al. |
| 2008/0263329 A1 | 10/2008 | Archer et al. |
| 2008/0288949 A1 | 11/2008 | Bohra et al. |
| 2008/0298380 A1 | 12/2008 | Rittmeyer et al. |
| 2008/0307082 A1 | 12/2008 | Cai et al. |
| 2009/0037377 A1 | 2/2009 | Archer et al. |
| 2009/0063816 A1 | 3/2009 | Arimilli et al. |
| 2009/0063817 A1 | 3/2009 | Arimilli et al. |
| 2009/0063891 A1 | 3/2009 | Arimilli et al. |
| 2009/0182814 A1 | 7/2009 | Tapolcai et al. |
| 2009/0247241 A1 | 10/2009 | Gollnick et al. |
| 2009/0292905 A1 | 11/2009 | Faraj |
| 2010/0017420 A1 | 1/2010 | Archer et al. |
| 2010/0049836 A1 | 2/2010 | Kramer |
| 2010/0074098 A1 | 3/2010 | Zeng et al. |
| 2010/0095086 A1 | 4/2010 | Eichenberger et al. |
| 2010/0185719 A1 | 7/2010 | Howard |
| 2010/0241828 A1 | 9/2010 | Yu et al. |
| 2011/0060891 A1 | 3/2011 | Jia |
| 2011/0066649 A1 | 3/2011 | Berlyant et al. |
| 2011/0119673 A1 | 5/2011 | Bloch et al. |
| 2011/0173413 A1 | 7/2011 | Chen et al. |
| 2011/0219208 A1 | 9/2011 | Asaad |
| 2011/0238956 A1 | 9/2011 | Arimilli et al. |
| 2011/0258245 A1 | 10/2011 | Blocksome et al. |
| 2011/0276789 A1 | 11/2011 | Chambers et al. |
| 2012/0063436 A1 | 3/2012 | Thubert et al. |
| 2012/0117331 A1 | 5/2012 | Krause et al. |
| 2012/0131309 A1 | 5/2012 | Johnson |
| 2012/0216021 A1 | 8/2012 | Archer et al. |
| 2012/0254110 A1 | 10/2012 | Takemoto |
| 2013/0117548 A1 | 5/2013 | Grover et al. |
| 2013/0159410 A1 | 6/2013 | Lee et al. |
| 2013/0318525 A1 | 11/2013 | Palanisamy et al. |
| 2013/0336292 A1 | 12/2013 | Kore et al. |
| 2014/0033217 A1 | 1/2014 | Vajda et al. |
| 2014/0047341 A1 | 2/2014 | Breternitz et al. |
| 2014/0095779 A1 | 4/2014 | Forsyth et al. |
| 2014/0122831 A1 | 5/2014 | Uliel et al. |
| 2014/0189308 A1 | 7/2014 | Hughes et al. |
| 2014/0211804 A1 | 7/2014 | Makikeni et al. |
| 2014/0280420 A1 | 9/2014 | Khan |
| 2014/0281370 A1 | 9/2014 | Khan |
| 2014/0362692 A1 | 12/2014 | Wu et al. |
| 2014/0365548 A1 | 12/2014 | Mortensen |

(56) References Cited

U.S. PATENT DOCUMENTS

| | | | |
|---|---|---|---|
| 2015/0106578 A1 | 4/2015 | Warfield et al. | |
| 2015/0143076 A1 | 5/2015 | Khan | |
| 2015/0143077 A1 | 5/2015 | Khan | |
| 2015/0143078 A1 | 5/2015 | Khan et al. | |
| 2015/0143079 A1 | 5/2015 | Khan | |
| 2015/0143085 A1 | 5/2015 | Khan | |
| 2015/0143086 A1 | 5/2015 | Khan | |
| 2015/0154058 A1 | 6/2015 | Miwa et al. | |
| 2015/0180785 A1* | 6/2015 | Annamraju | H04L 47/25 370/230 |
| 2015/0188987 A1 | 7/2015 | Reed et al. | |
| 2015/0193271 A1 | 7/2015 | Archer et al. | |
| 2015/0212972 A1 | 7/2015 | Boettcher et al. | |
| 2015/0269116 A1 | 9/2015 | Raikin et al. | |
| 2015/0379022 A1 | 12/2015 | Puig et al. | |
| 2016/0055225 A1 | 2/2016 | Xu et al. | |
| 2016/0065659 A1* | 3/2016 | Bloch | H04L 67/10 709/201 |
| 2016/0105494 A1 | 4/2016 | Reed et al. | |
| 2016/0112531 A1 | 4/2016 | Milton et al. | |
| 2016/0117277 A1 | 4/2016 | Raindel et al. | |
| 2016/0179537 A1 | 6/2016 | Kunzman et al. | |
| 2016/0219009 A1 | 7/2016 | French | |
| 2016/0248656 A1 | 8/2016 | Anand et al. | |
| 2016/0299872 A1 | 10/2016 | Vaidyanathan et al. | |
| 2016/0342568 A1 | 11/2016 | Burchard et al. | |
| 2016/0364350 A1* | 12/2016 | Sanghi | G06F 13/28 |
| 2017/0063613 A1 | 3/2017 | Bloch et al. | |
| 2017/0093715 A1 | 3/2017 | McGhee et al. | |
| 2017/0116154 A1 | 4/2017 | Palmer et al. | |
| 2017/0187496 A1 | 6/2017 | Shalev et al. | |
| 2017/0187589 A1* | 6/2017 | Pope | H04L 1/0082 |
| 2017/0187629 A1 | 6/2017 | Shalev et al. | |
| 2017/0187846 A1 | 6/2017 | Shalev et al. | |
| 2017/0199844 A1 | 7/2017 | Burchard et al. | |
| 2017/0255501 A1 | 9/2017 | Shuler et al. | |
| 2018/0004530 A1 | 1/2018 | Vorbach | |
| 2018/0046901 A1 | 2/2018 | Xie et al. | |
| 2018/0047099 A1* | 2/2018 | Bonig | G06Q 40/04 |
| 2018/0089278 A1 | 3/2018 | Bhattacharjee et al. | |
| 2018/0091442 A1 | 3/2018 | Chen et al. | |
| 2018/0097721 A1 | 4/2018 | Matsui et al. | |
| 2018/0173673 A1 | 6/2018 | Daglis et al. | |
| 2018/0262551 A1 | 9/2018 | Demeyer et al. | |
| 2018/0285316 A1 | 10/2018 | Thorson et al. | |
| 2018/0287928 A1 | 10/2018 | Levi et al. | |
| 2018/0302324 A1 | 10/2018 | Kasuya | |
| 2018/0321912 A1 | 11/2018 | Li et al. | |
| 2018/0321938 A1 | 11/2018 | Boswell et al. | |
| 2018/0367465 A1 | 12/2018 | Levi | |
| 2018/0375781 A1 | 12/2018 | Chen et al. | |
| 2019/0018805 A1* | 1/2019 | Benisty | G06F 13/1689 |
| 2019/0026250 A1 | 1/2019 | Das Sarma et al. | |
| 2019/0065208 A1 | 2/2019 | Liu et al. | |
| 2019/0068501 A1 | 2/2019 | Schneider et al. | |
| 2019/0102179 A1 | 4/2019 | Fleming et al. | |
| 2019/0102338 A1 | 4/2019 | Tang et al. | |
| 2019/0102640 A1 | 4/2019 | Balasubramanian | |
| 2019/0114533 A1 | 4/2019 | Ng et al. | |
| 2019/0121388 A1 | 4/2019 | Knowles et al. | |
| 2019/0138638 A1 | 5/2019 | Pal et al. | |
| 2019/0147092 A1 | 5/2019 | Pal et al. | |
| 2019/0235866 A1 | 8/2019 | Das Sarma et al. | |
| 2019/0303168 A1 | 10/2019 | Fleming, Jr. et al. | |
| 2019/0303263 A1 | 10/2019 | Fleming, Jr. et al. | |
| 2019/0324431 A1 | 10/2019 | Cella et al. | |
| 2019/0339688 A1 | 11/2019 | Cella et al. | |
| 2019/0347099 A1 | 11/2019 | Eapen et al. | |
| 2019/0369994 A1 | 12/2019 | Parandeh Afshar et al. | |
| 2019/0377580 A1 | 12/2019 | Vorbach | |
| 2020/0005859 A1 | 1/2020 | Chen et al. | |
| 2020/0034145 A1 | 1/2020 | Bainville et al. | |
| 2020/0057748 A1 | 2/2020 | Danilak | |
| 2020/0103894 A1 | 4/2020 | Cella et al. | |
| 2020/0106828 A1 | 4/2020 | Elias et al. | |
| 2020/0137013 A1 | 4/2020 | Jin et al. | |

OTHER PUBLICATIONS

Cosnard et al., "Symbolic Scheduling of Parameterized Task Graphs on Parallel Machines," Combinatorial Optimization book series (COOP, vol. 7), pp. 217-243, year 2000.

Jeannot et al., "Automatic Multithreaded Parallel Program Generation for Message Passing Multiprocessors using paramerized Task Graphs", World Scientific, pp. 1-8, Jul. 23, 2001.

Stone, "An Efficient Parallel Algorithm for the Solution of a Tridiagonal Linear System of Equations," Journal of the Association for Computing Machinery, vol. 10, No. 1, pp. 27-38, Jan. 1973.

Kogge et al., "A Parallel Algorithm for the Efficient Solution of a General Class of Recurrence Equations," IEEE Transactions on Computers, vol. C-22, No. 8, pp. 786-793, Aug. 1973.

Hoefler et al., "Message Progression in Parallel Computing—To Thread or not to Thread?", 2008 IEEE International Conference on Cluster Computing, pp. 1-10, Tsukuba, Japan, Sep. 29-Oct. 1, 2008.

U.S. Appl. No. 16/357,356 office action dated May 14, 2020.

European Application # 20156490.3 search report dated Jun. 25, 2020.

Bruck et al., "Efficient Algorithms for All-to-All Communications in Multiport Message-Passing Systems", IEEE Transactions on Parallel and Distributed Systems, vol. 8, No. 11, pp. 1143-1156, Nov. 1997.

Bruck et al., "Efficient Algorithms for All-to-All Communications in Multiport Message-Passing Systems", Proceedings of the sixth annual ACM symposium on Parallel algorithms and architectures, pp. 298-309, Aug. 1, 1994.

Chiang et al., "Toward supporting data parallel programming on clusters of symmetric multiprocessors", Proceedings International Conference on Parallel and Distributed Systems, pp. 607-614, Dec. 14, 1998.

Gainaru et al., "Using InfiniBand Hardware Gather-Scatter Capabilities to Optimize MPI All-to-All", Proceedings of the 23rd European MPI Users' Group Meeting, pp. 167-179, Sep. 2016.

Pjesivac-Grbovic et al., "Performance Analysis of MPI Collective Operations", 19th IEEE International Parallel and Distributed Processing Symposium, pp. 1-19, 2015.

Mellanox Technologies, "InfiniScale IV: 36-port 40GB/s Infiniband Switch Device", pp. 1-2, year 2009.

Mellanox Technologies Inc., "Scaling 10Gb/s Clustering at Wire-Speed", pp. 1-8, year 2006.

IEEE 802.1D Standard "IEEE Standard for Local and Metropolitan Area Networks—Media Access Control (MAC) Bridges", IEEE Computer Society, pp. 1-281, Jun. 9, 2004.

IEEE 802 1AX Standard "IEEE Standard for Local and Metropolitan Area Networks—Link Aggregation", IEEE Computer Society, pp. 1-163, Nov. 3, 2008.

Turner et al., "Multirate Clos Networks", IEEE Communications Magazine, pp. 1-11, Oct. 2003.

Thayer School of Engineering, "An Slightly Edited Local Copy of Elements of Lectures 4 and 5", Dartmouth College, pp. 1-5, Jan. 15, 1998 http://people.seas.harvard.edu/~jones/cscie129/nu_lectures/lecture11/switching/clos_network/clos_network.html.

"MPI: A Message-Passing Interface Standard," Message Passing Interface Forum, version 3 1, pp. 1-868, Jun. 4, 2015.

Coti et al., "MPI Applications on Grids: a Topology Aware Approach," Proceedings of the 15th International European Conference on Parallel and Distributed Computing (EuroPar'09), pp. 1-12, Aug. 2009.

Petrini et al., "The Quadrics Network (QsNet): High-Performance Clustering Technology," Proceedings of the 9th IEEE Symposium on Hot Interconnects (Hotl'01), pp. 1-6, Aug. 2001.

Sancho et al., "Efficient Offloading of Collective Communications in Large-Scale Systems," Proceedings of the 2007 IEEE International Conference on Cluster Computing, pp. 1-10, Sep. 17-20, 2007.

(56) References Cited

OTHER PUBLICATIONS

Infiniband Trade Association, "InfiniBand™ Architecture Specification", release 1.2.1, pp. 1-1727, Jan. 2008.
Elias et al., U.S. Appl. No. 16/357,356, filed Mar. 19, 2019.
Deming, "Infiniband Architectural Overview", Storage Developer Conference, pp. 1-70, year 2013.
Fugger et al., "Reconciling fault-tolerant distributed computing and systems-on-chip", Distributed Computing, vol. 24, Issue 6, pp. 323-355, Jan. 2012.
Wikipedia, "System on a chip", pp. 1-4, Jul. 6, 2018.
Villavieja et al., "On-chip Distributed Shared Memory", Computer Architecture Department, pp. 1-10, Feb. 3, 2011.
Chapman et al., "Introducing OpenSHMEM: SHMEM for the PGAS Community," Proceedings of the Forth Conferene on Partitioned Global Address Space Programming Model, pp. 1-4, Oct. 2010.
Priest et al., "You've Got Mail (YGM): Building Missing Asynchronous Communication Primitives", IEEE International Parallel and Distributed Processing Symposium Workshops, pp. 221-230, year 2019.
Wikipedia, "Nagle's algorithm", pp. 1-4, Dec. 12, 2019.
U.S. Appl. No. 16/750,019 Office Action dated Jun. 15, 2021.
Yang et al., "SwitchAgg: A Further Step Toward In-Network Computing," 2019 IEEE International Conference on Parallel & Distributed Processing with Applications, Big Data & Cloud Computing, Sustainable Computing & Communications, Social Computing & Networking, pp. 36-45, Dec. 2019.
EP Application # 20216972 Search Report dated Jun. 11, 2021.
U.S. Appl. No. 16/782,118 Office Action dated Jun. 3, 2021.
U.S. Appl. No. 16/789,458 Office Action dated Jun. 10, 2021.
U.S. Appl. No. 16/782,118 Office Action dated Nov. 8, 2021.
"Message Passing Interface (MPI): History and Evolution," Virtual Workshop, Cornell University Center for Advanced Computing, NY, USA, pp. 1-2, year 2021, as downloaded from https://cvw.cac.cornell.edu/mpi/history.
Pacheco, "A User's Guide to MPI," Department of Mathematics, University of San Francisco, CA, USA, pp. 1-51, Mar. 30, 1998.
Wikipedia, "Message Passing Interface," pp. 1-16, last edited Nov. 7, 2021, as downloaded from https://en.wikipedia.org/wiki/Message_Passing_Interface.

\* cited by examiner

STREAMING SYSTEM

PRIORITY CLAIM

The present application claims priority from U.S. Provisional Patent Application 62/681,708 of Levi et al, filed 7 Jun. 2018 and entitled Synchronized Streaming; and from U.S. Provisional Patent Application 62/793,401 of Levi et al, filed 17 Jan. 2019 and entitled Aggregated Doorbell Synchronization.

FIELD OF THE INVENTION

The present invention relates to synchronization of input/output between individual processes/threads.

BACKGROUND OF THE INVENTION

When individual processes or threads each perform input/output, but the input/output of the individual processes or threads is related, synchronization of the individual processes or threads may be a challenge.

SUMMARY OF THE INVENTION

The present invention, in certain embodiments thereof, seeks to provide an improved system for synchronization of input/output between individual processes/threads and/or to provide synchronization to a timeline, whether a global timeline, a machine timeline, or a network timeline.

For simplicity of description, either one of the terms "process" and "thread" (in their various grammatical forms) may be used herein to denote either a process or a thread.

There is thus provided in accordance with an exemplary embodiment of the present invention a system including a processor including a transmit process configured to store information including a queue of packets to be transmitted, the queue of packets to be transmitted defining a plurality of transmit process packets to be transmitted, each of the plurality of transmit process packets to be transmitted being associated with a transmission time, and a synchronization process being configured to receive from the transmit process at least a portion of the information, wherein the synchronization process is further configured to perform one of the following: A) to access a dummy send queue and a completion queue, and to transmit one or more of the plurality of transmit process packets to be transmitted in accordance with a completion queue entry in the completion queue, and B) to send a doorbell to transmission hardware at a time when at least one of the plurality of transmit process packets is to be transmitted, the synchronization process including a master queue configured to store a plurality of transmission entries, each transmission entry including a transmit process indicator, and an indication of transmit process packets to be transmitted.

Further in accordance with an exemplary embodiment of the present invention the synchronization process is configured to perform the following: to access a dummy send queue and a completion queue, and to transmit one or more of the plurality of packets to be transmitted in accordance with a completion queue entry in the completion queue.

Still further in accordance with an exemplary embodiment of the present invention the synchronization process is configured to perform the following: to send a doorbell to transmission hardware at a time when at least one of the plurality transmit process packets is to be transmitted, the synchronization process including a master queue configured to store a plurality of transmission entries, each transmission entry including a transmit process indicator, and an indication of transmit process packets to be transmitted.

Additionally in accordance with an exemplary embodiment of the present invention the transmit process includes a plurality of transmit processes, each of the plurality of transmit processes being configured to store information including a queue of packets to be transmitted, each queue of packets to be transmitted defining a plurality of transmit process packets to be transmitted, each of the plurality of transmit process packets to be transmitted being associated with a transmission time.

Moreover in accordance with an exemplary embodiment of the present invention each transmission entry also includes a time for transmission of the transmit process packets to be transmitted.

Further in accordance with an exemplary embodiment of the present invention the packets include video packets, and each transmission entry also includes a number of packets per frame and a number of frames per second.

Still further in accordance with an exemplary embodiment of the present invention the system also includes a co-processor, and the synchronization process is instantiated in the co-processor.

Additionally in accordance with an exemplary embodiment of the present invention the co-processor includes an FTP or PTP client.

Moreover in accordance with an exemplary embodiment of the present invention the co-processor includes a network interface card.

Further in accordance with an exemplary embodiment of the present invention the network interface card includes the transmission hardware.

Still further in accordance with an exemplary embodiment of the present invention the co-processor includes an FPGA.

There is also provided in accordance with another exemplary embodiment of the present invention a method including configuring a transmit process to store information including a queue of packets to be transmitted, the queue of packets to be transmitted defining a plurality of transmit process packets to be transmitted, each of the plurality of transmit process packets to be transmitted being associated with a transmission time, and configuring a synchronization process to receive from the transmit process at least a portion of the information, wherein the transmit process and the synchronization process are included in a processor, and the synchronization process is further configured to perform one of the following: A) to access a dummy send queue and a completion queue, and to transmit one or more of the plurality of transmit process packets to be transmitted in accordance with a completion queue entry in the completion queue, and B) to send a doorbell to transmission hardware at a time when at least one of the plurality of transmit process packets is to be transmitted, the synchronization process including a master queue configured to store a plurality of transmission entries, each transmission entry including a transmit process indicator, and an indication of transmit process packets to be transmitted.

Further in accordance with an exemplary embodiment of the present invention the synchronization process accesses a dummy send queue and a completion queue, and transmits one or more of the plurality of packets to be transmitted in accordance with a completion queue entry in the completion queue.

Still further in accordance with an exemplary embodiment of the present invention the synchronization process performs the following: sends a doorbell to transmission hardware at a time when at least one of the plurality transmit process packets is to be transmitted, the synchronization process including a master queue configured to store a plurality of transmission entries, each transmission entry including a transmit process indicator, and an indication of transmit process packets to be transmitted.

Additionally in accordance with an exemplary embodiment of the present invention the transmit process includes a plurality of transmit processes, each of the plurality of transmit processes storing information including a queue of packets to be transmitted, each queue of packets to be transmitted defining a plurality of transmit process packets to be transmitted, each of the plurality of transmit process packets to be transmitted being associated with a transmission time.

Moreover in accordance with an exemplary embodiment of the present invention each transmission entry also includes a time for transmission of the transmit process packets to be transmitted.

Further in accordance with an exemplary embodiment of the present invention the packets include video packets, and each transmission entry also includes a number of packets per frame and a number of frames per second.

Still further in accordance with an exemplary embodiment of the present invention the synchronization process is instantiated in a co-processor.

Additionally in accordance with an exemplary embodiment of the present invention the co-processor includes a network interface card.

Moreover in accordance with an exemplary embodiment of the present invention the co-processor includes an FPGA.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1:
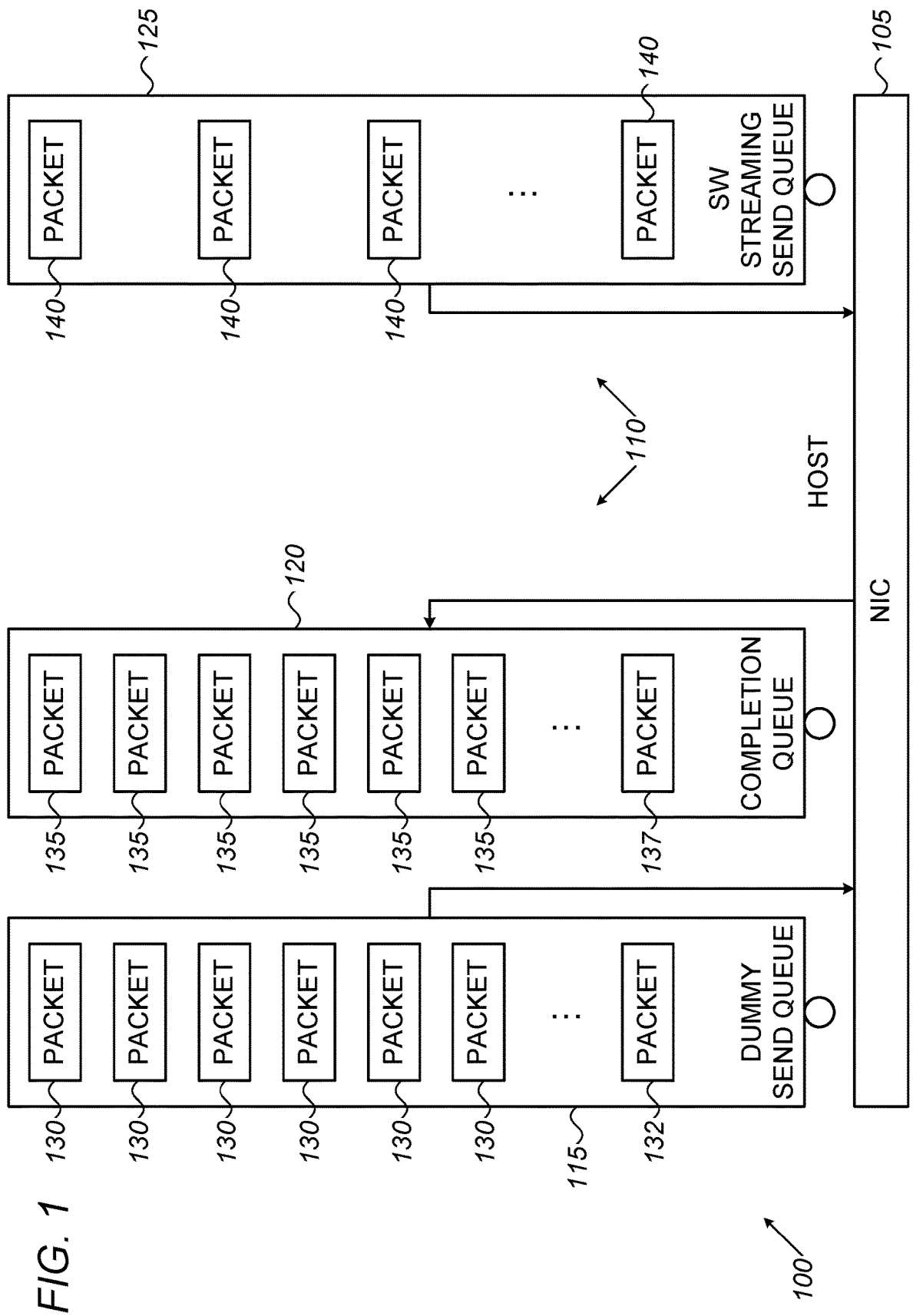
FIG. 1 is a simplified block diagram illustration of a system for synchronization, constructed and operative in accordance with an exemplary embodiment of the present invention.

The following is a general description which will assist in understanding exemplary embodiments of the present invention.

Various networking domains require that transmission be synchronized and timing-accurate. One non-limiting example of such a networking domain is video streaming. Specifically, raw video streaming, in which one or more video flows are used, has a requirement of tight timing constraints for each video flow. Another non-limiting example relates to channel arbitration in Time Division Multiple Access (TDMA) systems. More specifically, TDMA can be used in an application and compute cluster to help solve the congestion control problem in the network of the cluster by allocating to each node and each flow a fixed bandwidth in a specific time slot. Thus, the nodes will have to be synchronized in time, and the transmission will have to be timely accurate.

Accurate streaming requires that a specific flow bandwidth will be accurate (that the bandwidth will be as specified). Accurate streaming also requires that specific data (by way of non-limiting example, specific video data) is transmitted at a specific time. In the non-limiting case of video, if a platform runs several video streaming processes or threads, the inventors of the present invention believe that in known systems those processes or threads are each required to synchronize with the correct time and between themselves, in order to be able to transmit specific data in synchronization as accurately as possible.

As used throughout the present specification and claims, the term "synchronization", in all of its grammatical forms, may refer to one or more of:

Synchronization between various processes/threads

Synchronization between each process/thread to a machine/global/network time

It is appreciated that sometimes, in a streaming flow, there is more than one streaming requirement. By way of non-limiting example, there are "packet level" requirements, and application level requirements. To be more specific in the context of a particular non-limiting example, in raw video streaming, as described in the SMPTE 2110 standard, the packet level reequipments are on the order of 100s of nanoseconds, and the requirement is between packets within the same flow, while application level requirements, (in this specific non-limiting example: Video Frame, or Video Field) is required to be synchronized to a global/network time.

Synchronization restrictions (as known, in the opinion of the inventors of the present invention, before the present invention) require clock distribution among application threads and some level of intensive polling in software; the intensive polling and clock distribution each result in a dramatic load on the CPU, regardless of the bandwidth transmitted by the flow, since synchronization is required for the first packet of each frame. It is also common that in a given server/platform, there are several processes/threads/CPU cores engaged in video transmission, so that the CPU load for polling to obtain synchronization is correspondingly increased.

In general, synchronization of output between several processes/threads/CPU cores is known from the following patents of Bloch et al, the disclosures of which are hereby incorporated herein by reference:

U.S. Pat. No. 8,811,417;

U.S. Pat. No. 9,344,490; and

U.S. Pat. No. 10,158,702.

Features of exemplary embodiments of the present invention are now briefly described. Herein, when the term "process" in its various grammatical forms is used, it will be appreciated that "thread" or "CPU core" is also intended as a possible alternative.

The following description uses video streaming as one particular, non-limiting detailed example of streaming. It is appreciated, however, that exemplary embodiments of the present invention relate to streaming in general, and are in no way limited to video streaming (see, for example, the above-mentioned example relating to TDMA).

In exemplary embodiments of the present invention, each process running video streaming/synchronized streaming does not itself need to deal with the synchronization. Rather, in each such process, the software creates the video packets, and made those packets ready in a queue for transmission, prior to the intended transmission time.

For each platform (which incorporates a plurality of processes), a single process is, in exemplary embodiments, responsible for synchronizing all streams on that platform (such a process is termed herein a "synchronization process").

General Explanation of Some Exemplary Embodiments

In some exemplary embodiments, the following is an explanation of how the synchronization process operates.

Accurate packet pacing may be achieved because a network interface card (NIC) is capable of transmitting a specific number of requests in a specific interval of time. A NIC is also capable of performing pacing for non-packet work requests; that is, for work requests that do not generate packets. A null operation (NOP) work request is an example of a non-packet work request which does not perform any activity towards the network medium (such as an Ethernet wire), but rather perform internal operations involving the NIC and associated driver, such as creating a completion queue entry, as is known (by way of non-limiting example) in the art of InfiniBand and of Ethernet. By way of one particular non-limiting example, a NOP work request might take the same time as transmission of 8 bits, and might therefore be used in delay or in rate limiting to specify 8 bits of delay or of rate limiting, it being appreciated that the example of 8 bits is a very particular example which is not meant to be limiting.

A "send enable" work request (which may comprise a work queue element (WQE), as is known in InfiniBand) is posted to a so-called "master" send queue. The posted WQE has a form/contents which indicated that a WQE from a "different" queue (not from the master send queue) should be executed and sent. In the meantime, in the "different" queue, a slave send queue, WQEs are posted indicating that data should be sent. However, continuing with the present example, in the slave queue no doorbell is executed, so the WQEs in the slave queue are not executed and sent at the time that the WQEs are posted; such doorbell/s are generally sent to a network interface controller (NIC) which has access to the queues and to memory pointed to by WQEs. In the meantime a hardware packing mechanism causes doorbells to be generated by the NIC (generally every short and deterministic period of time, such as for example every few nanoseconds); these doorbells are executed in the master queue, causing NOP WQEs (each of which produces a delay as specified above) to be executed; finally, when the "send enable" work request in the master send queue is executed, this causes a doorbell to be issued to the slave queue, and the WQEs therein are then executed, causing data (packets) indicated by the slave queue WQEs to be sent. Thus, the master queue synchronizes send of data based on the WQEs in the slave queue.

The solution described immediately above may create many queues, because there is master queue per slave queue, and hence one master queue per stream of packets to be sent. An alternative solution may be implemented as follows, with all streams for a given bit rate being synchronized to a master queue for that bit rate:

For every specific synchronization interval (that is, for every given time desired between doorbells in a slave queue, the doorbells causing, as described above, data packets to be sent) a reference queue ("master" queue) is established, containing a constant number of NOP work requests followed by a send enable work request. In the particular non-limiting example in which a NOP work request has the same transmission time as 8 bits and therefore represents 8 bits of delay (with the same being true for a send enable work request), then:

$$\frac{((\text{number of } NOP \text{ plus Send Enable work requests}) * 8 \text{ bits})}{\text{bitrate}}$$

should be exactly equal to the synchronization interval (to an accuracy of the transmission time of 8 bits). If higher accuracy is needed, the bitrate for the "master" queue and the number of NOP work requests could be increased in order to increase accuracy.

After the NOP work requests as described above have been posted, the send enable work request as described above is posted. The send enable work request sends a doorbell to each slave queue, such that each slave queue will send data packets in accordance with the WQEs therein.

Dedicated software (which could alternatively be implemented in firmware, hardware, etc.) indefinitely continues to repost NOP and send enable work requests to the "master" queue, so that the process continues with subsequent synchronization intervals; it being appreciated that if no more data packets are to be sent, the dedicated software may cease to post NOP and send enable work requests in the "master" queue (which ceasing may be based on user intervention).

From the above description it will be appreciated that the software overhead in this alternative solution is per synchronization period, not per transmitted queue, nor per bitrate.

With reference to the above-described embodiments, alternatively the doorbell sent to the slave queue or queues may be sent when a completion queue entry (CQE) is posted to a completion queue, after processing of a send enable WQE.

General Explanation of Other Exemplary Embodiments

In other exemplary embodiments of the present invention, the following is a general explanation of how the synchronization process operates. The synchronization process, in such exemplary embodiments, receives the following information from each process which is running streaming:
1. How many packets per packet transmission burst (N may represent the number of packets per burst).
2. How many packets per second (PPS may represent the number of packets per second)
3. Time of first packet transmission burst (T0 may represent the time to transmit the first packet/s, then Tn, the time to transmit a future packet, is given by Tn=T0+PPS/N).
4. Then kbps, the bit rate in kilobits per second, which may be useful for hardware configuration, is given by kbps=1000*8*PPS*average packet size in bytes Thus, the synchronization process has all of the information needed to know when each packet should be sent, and can coordinate sending of packets from various processes.

Translating the above terms into terminology which is specific to video (for the particular non-limiting example of video), the information which the synchronization process receives from each process running streaming is:
1. Number of packets per frame
2. Number of frames per second
3. Time of transmission of the first frame When the time to send a frame from a specific queue arrives, the synchronizing process uses the mechanism called send enable (as described above), allowing one queue to send a doorbell for other queues. Thus, each of the processes/threads will deal with their data, with all the synchronization effort being handled by a single thread, publishing the doorbells for the other processes. Thus, both CPU offload (due to a vastly reduced need for time synchronization) and very accurate streaming are enabled.

A further advantage may be obtained if different processes wish to send data at the same time; the synchronization process may consolidate such multiple send requests into a single, or a smaller number, of send requests.

A still further advantage may be obtained in that, by better synchronization of sent data, better utilization of available send bandwidth may be obtained.

For a general discussion of "send enable", see the following patents of Bloch et al, the disclosures of which have been incorporated herein by reference:

U.S. Pat. No. 8,811,417;
U.S. Pat. No. 9,344,490; and
U.S. Pat. No. 10,158,702.

In certain exemplary embodiments, the synchronization process may reside on a separate processor or co-processor (such as, for example, the BlueField™ smart network interface card (smart NIC), commercially available from Mellanox Technologies Ltd.); in some cases this may enhance the advantage of having a separate process for synchronization. It is appreciated that any appropriate co-processor may be used; one further non-limiting example of an appropriate co-processor is an appropriate FPGA.

It is appreciated that, when the synchronization process takes place on a processor which is more tightly coupled with a network adapter (one non-limiting example of which is the smart NIC co-processor as in BlueField™, referred to above), this will generally result in a much more accurate streaming model. In certain exemplary embodiments, a further advantage may be obtained when the synchronization requirements with time are done using Precision Time Protocol (PTP) or Network Time Protocol (NTP), as are known in the art. Usually in such systems the NTP/PTP client runs on one process and needs to distribute the accurate NTP/PTP timing signals to all relevant processes. With the suggested architecture, the PTP client does not need to share the timing information with other processes and threads, which means that, compared to other architectures:

a very significant amount of work is no longer needed synchronization requirements between the processes and the PTP processes are obviated testing each application against any type of PTP client is not needed (there are many PTP clients in the market, and each one has a different API. This method decouples the PTP client from the application and allow it to remain application agnostic).

Another advantage is that the PTP client can run on the master process, and also on the co-processor as described above.

Reference is now made to FIG. 1, which is a simplified block diagram illustration of a system for synchronization, constructed and operative in accordance with an exemplary embodiment of the present invention.

The system of FIG. 1, generally designated 100, includes a network interface controller (NIC) 105 (which may comprise any appropriate NIC such as, by way of one particular non-limiting example, a ConnectX-5 NIC, commercially available from Mellanox Technologies Ltd.). The system of FIG. 1 also includes a host 110, which may comprise any appropriate computer; the host/computer may also termed herein a "processor". A NIC may also be referred to herein as "transmission hardware".

In a memory (not explicitly shown) of the host 110, three queues are shown:

a dummy send queue 115, comprising a plurality of dummy WQEs 130, and a non-dummy WQE 132;

a completion queue 120, comprising a plurality of dummy completion queue entries (CQE) 135, and a non-dummy CQE 137; and a software streaming send queue 125, comprising a plurality of data WQEs 140.

For simplicity of depiction, in FIG. 1 each of the dummy WQEs 130, the non-dummy WQE 132, the dummy CQEs 135, the non-dummy CQE 137 and the data WQEs 140 are labeled "packet".

An exemplary mode of operation of the system of FIG. 1 is now briefly described. It is appreciated that, for sake of simplicity of depiction and description, the exemplary embodiment shown and described with respect to FIG. 1 is consistent with the exemplary embodiment discussed above, in which there is a single master queue per slave queue. It will be appreciated that the depiction and description with respect to FIG. 1 may also be applicable to the exemplary embodiment discussed above, in which there are a plurality of slave queues per master queue, mutatis mutandis.

The dummy send queue 115 is filled (in exemplary embodiments by software running on the host 110) with a plurality of dummy WQEs 130 (in exemplary embodiments, posted by the software running on the host 110), which are used as described above as NOPs for the purpose of achieving synchronization. In the meantime, a plurality of data WQEs 140 are posted in the software streaming send queue 125 (in exemplary embodiments by software running in one or more processes on the host 110). As is known in the art, each of the plurality of data WQEs 140 points to a data packet to be sent (the data packet not shown), in a memory (not explicitly shown) of the host 110.

Each of the dummy WQEs 130 is executed, causing a NOP delay, and creating a dummy CQE 135. Finally, a non-dummy send enable WQE 132 (posted, in exemplary embodiments, to the dummy send queue 115 by the software running on the host 110) is executed, creating a non-dummy send enable CQE 137. When the non-dummy CQE 137 is created, a send enable mechanism is used to send a doorbell to the software streaming send queue 125, causing data packets pointed to by the plurality of data WQEs 140 therein to be sent.

Figure 2:
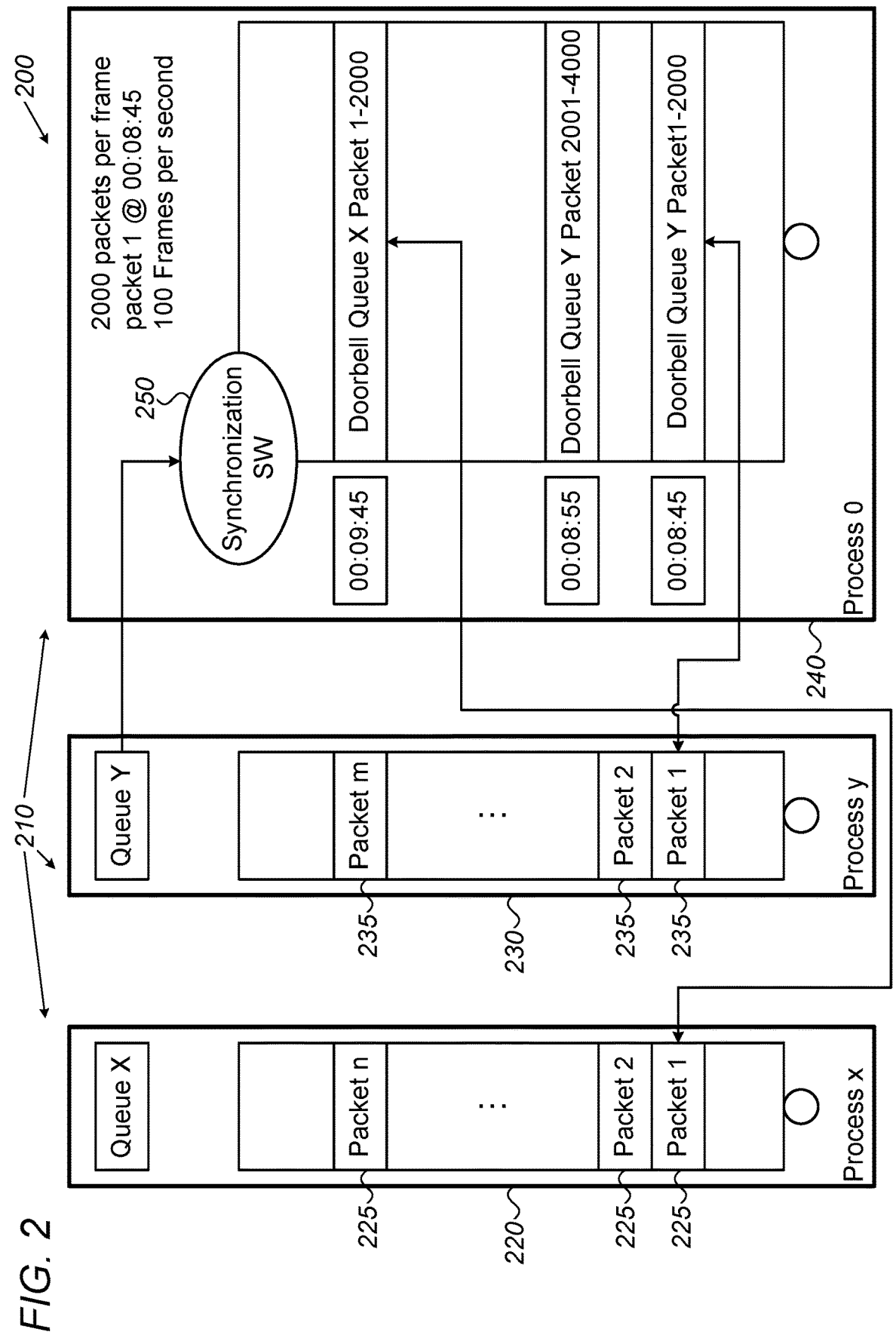
FIG. 2 is a simplified block diagram illustration of a system for synchronization, constructed and operative in accordance with another exemplary embodiment of the present invention.

Reference is now made to FIG. 2, which is a simplified block diagram illustration of a system for synchronization, constructed and operative in accordance with another exemplary embodiment of the present invention. The exemplary embodiment of FIG. 2 relates to the above section entitled "General explanation of other exemplary embodiments".

The system of FIG. 2, generally designated 200, includes a network interface controller (NIC) (not shown for simplicity of depiction and description) which may comprise any appropriate NIC such as, by way of one particular non-limiting example, a ConnectX-5 NIC, commercially available from Mellanox Technologies Ltd. The system of FIG. 2 also includes a host 210, which may comprise any appropriate computer.

In a memory (not explicitly shown) of the host 210, three queues of three processes are shown are shown:

a process X queue 220;
a process Y queue 230;
and a process 0 queue 240.

In terms of the above "General explanation of other exemplary embodiments", process X and associated process X queue 220 represent a first process and a WQE queue associated therewith, respectively, the process X queue 220 having WQEs 225 pointing to data packets to be sent from process X. Similarly, process Y and associated process Y queue 230 represent a second process and a WQE queue associated therewith, respectively, the process Y queue 230 having WQEs 230 pointing to data packets to be sent from process Y. Process 0 and associated process 0 queue 240 represent a synchronization process.

It is appreciated that further processes and queues beyond the process X queue 220 and the process Y queue 230 may be used; two such queues are shown in FIG. 2 for simplicity of depiction and description.

An exemplary mode of operation of the system of FIG. 2 is now briefly described.

In order to prepare data packets for synchronized transmission, process X posts WQEs 225, pointing to data packets for transmission, to the process X queue 220. Similarly, process Y posts WQEs 230, pointing to data packets for transmission, to the process Y queue 230.

In addition, process Y informs process 0 that 2000 packets per frame are to be transmitted, with packet 1 thereof being transmitted at time 00:08:45, at a frame rate of 100 frames per second. Once the WQEs 225 and been posted and process 0 has been notified, neither process Y nor process 0 needs to spend CPU time on packet transmission, until (or until shortly before) 00:08:45. At or shortly before 00:08:45, and (as depicted in FIG. 2) sends a doorbell to enable transmission of queue Y packets 1-2000.

Similarly (with some details omitted from FIG. 2 for sake of simplicity of depiction), based on notifications received from processes X and Y, process 0 sends doorbells to enable transmission of: queue Y packets 2001-4000 at 00:08:55; and queue X packets 1-2000 at 00:09:45.

As depicted in FIG. 2, the various synchronization actions described above as carried out by process 0 may be handled by synchronization software 250 (which may alternatively be implemented in firmware, hardware, or in any other appropriate way).

Figure 3:
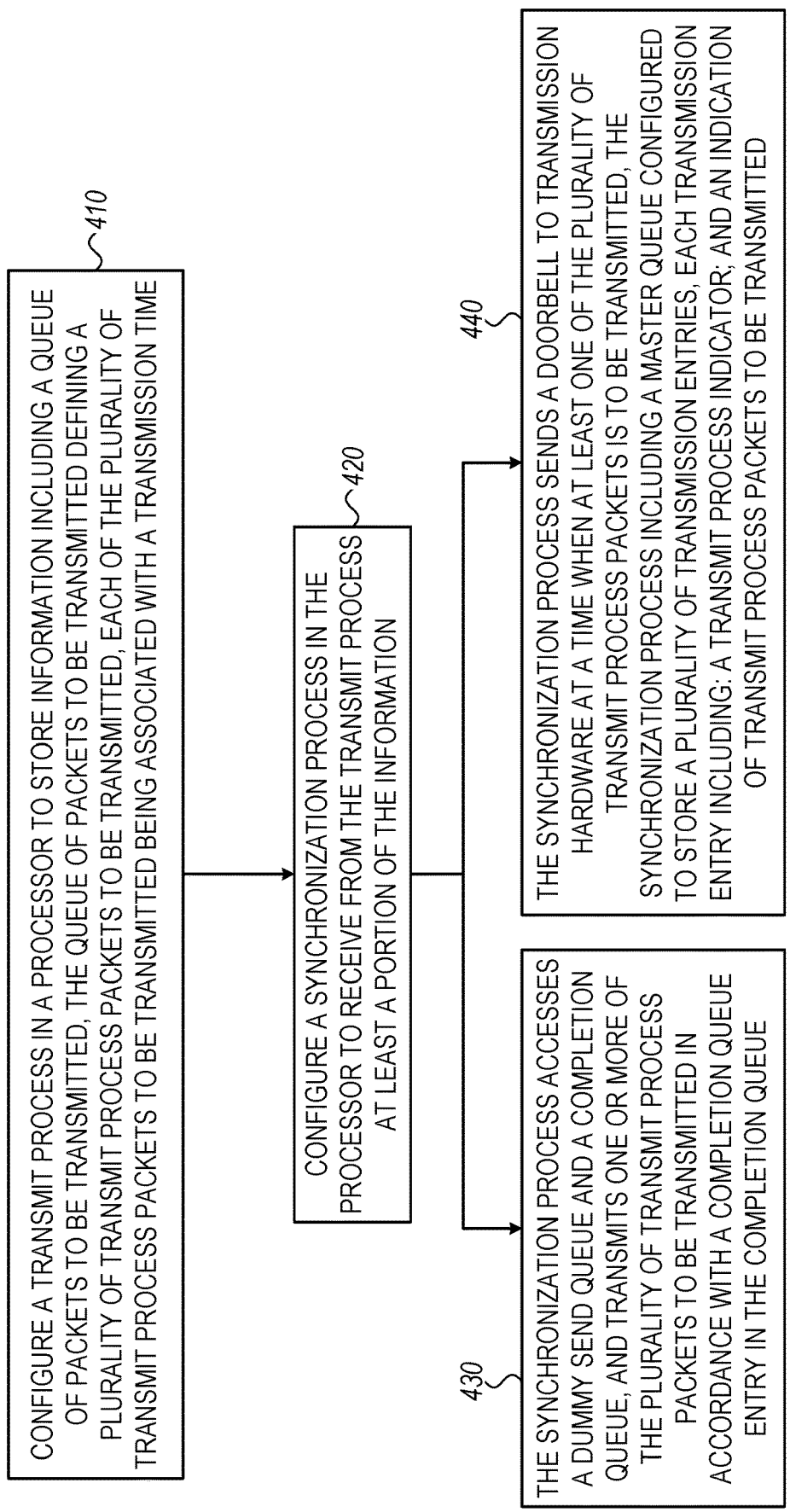
FIG. 3 is a simplified flowchart illustration of an exemplary method of operation of the systems of FIGS. 1 and 2.

Reference is now made to FIG. 3, which is a simplified flowchart illustration of an exemplary method of operation of the systems of FIGS. 1 and 2.

A transmit process is configured in a processor. The transmit process stores information including a queue of packets to be transmitted. The queue of packets to be transmitted defines a plurality of transmit process packets to be transmitted; each of the plurality of transmit process packets to be transmitted is associated with a transmission time (step 410).

A synchronization process is configured in the processor, for receiving from the transmit process at least a portion of the information (step 420).

Either or both of steps 430 and 440 are then executed; generally speaking, step 430 corresponds to the system of FIG. 1, while step 440 corresponds to the system of FIG. 2.

The synchronization process accesses a dummy send queue and a completion queue, and transmits one or more of the plurality of transmit process packets to be transmitted in accordance with a completion queue entry in the completion queue (step 430).

The synchronization process sends a doorbell to transmission hardware at a time when at least one of the plurality of transmit process packets is to be transmitted. The synchronization process includes a master queue configured to store a plurality of transmission entries, and each transmission entries includes: a transmit process indicator; and an indication of transmit process packets to be transmitted (step 440).

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove.

What is claimed is:

1. A system comprising:
a processor comprising:
   a transmit process configured to store information comprising a queue of packets to be transmitted, the queue of packets to be transmitted defining a plurality of transmit process packets to be transmitted, each of said plurality of transmit process packets to be transmitted being associated with a transmission time; and
   a synchronization process being a distinct process from said transmit process and being configured to receive from said transmit process at least a portion of said information,
wherein the synchronization process is further configured to hold:
   a plurality of null operation (NOP) work requests each operative to cause a fixed delay when processed;
   at least one cross-process send enable work request operative, when processed, to send a doorbell to transmission hardware at a time when at least one of said plurality of transmit process packets is to be transmitted; and
   a plurality of transmission entries, each transmission entry comprising: a transmit process indicator; and an indication of transmit process packets to be transmitted.

2. The system according to claim 1 and wherein the synchronization process is configured to perform the following: to access a dummy send queue and a completion queue, and to transmit one or more of the plurality of packets to be transmitted in accordance with a completion queue entry in the completion queue.

3. The system according to claim 1 and wherein the transmit process comprises a plurality of transmit processes, each of said plurality of transmit processes being configured to store information comprising a queue of packets to be transmitted, each said queue of packets to be transmitted defining a plurality of transmit process packets to be transmitted, each of said plurality of transmit process packets to be transmitted being associated with a transmission time.

4. The system according to claim 1 and wherein each transmission entry also comprises a time for transmission of said transmit process packets to be transmitted.

5. The system according to claim 4 and wherein the packets comprise video packets, and
each transmission entry also comprises a number of packets per frame and a number of frames per second.

6. The system according to claim 1 and also comprising a co-processor, wherein the synchronization process is instantiated in the co-processor.

7. The system according to claim 6 and wherein the co-processor includes an FTP or PTP client.

8. The system according to claim 6 and wherein the co-processor comprises a network interface card.

9. The system according to claim 8 and wherein the network interface card comprises the transmission hardware.

10. The system according to claim 6 and wherein the co-processor comprises an FPGA.

11. A method comprising:
configuring a transmit process to store information comprising a queue of packets to be transmitted, the queue of packets to be transmitted defining a plurality of transmit process packets to be transmitted, each of said plurality of transmit process packets to be transmitted being associated with a transmission time; and
configuring a synchronization process distinct from the transmit process to receive from said transmit process at least a portion of said information,
wherein the transmit process and the synchronization process are comprised in a processor, and
the synchronization process is further configured to hold:
a plurality of null operation (NOP) work requests each operative to cause a fixed delay when processed;
at least one cross-process send enable work request operative, when processed, to send a doorbell to transmission hardware at a time when at least one of said plurality of transmit process packets is to be transmitted; and
send a doorbell to transmission hardware at a time when at least one of said plurality of transmit process packets is to be transmitted, the synchronization process comprising a plurality of transmission entries, each transmission entry comprising: a transmit process indicator; and an indication of transmit process packets to be transmitted.

12. The method according to claim 11 and wherein the synchronization process accesses a dummy send queue and a completion queue, and transmits one or more of the plurality of packets to be transmitted in accordance with a completion queue entry in the completion queue.

13. The method according to claim 11 and wherein the transmit process comprises a plurality of transmit processes, each of said plurality of transmit processes storing information comprising a queue of packets to be transmitted, each said queue of packets to be transmitted defining a plurality of transmit process packets to be transmitted, each of said plurality of transmit process packets to be transmitted being associated with a transmission time.

14. The method according to claim 11 and wherein each transmission entry also comprises a time for transmission of said transmit process packets to be transmitted.

15. The method according to claim 14 and wherein the packets comprise video packets, and
each transmission entry also comprises a number of packets per frame and a number of frames per second.

16. The method according to claim 11 and wherein the synchronization process is instantiated in a co-processor.

17. The method according to claim 11 and wherein the co-processor comprises a network interface card.

18. The method according to claim 16 and wherein the co-processor comprises an FPGA.

* * * * *